United States Patent [19]

Eitoku et al.

[11] Patent Number: 4,715,220

[45] Date of Patent: Dec. 29, 1987

[54] THROTTLE VALVE OPENING SENSOR

[75] Inventors: Kenji Eitoku; Kenji Hayashi, both of Obu, Japan

[73] Assignee: Aisan Kogyo KK, Obu, Japan

[21] Appl. No.: 932,590

[22] Filed: Nov. 20, 1986

[30] Foreign Application Priority Data

Dec. 5, 1985 [JP] Japan .......................... 60-187907[U]

[51] Int. Cl.⁴ ............................................. G01D 11/24

[52] U.S. Cl. ..................................... 73/118.1; 73/431; 338/199

[58] Field of Search ............... 338/232, 249, 252, 256, 338/274, 276, 199; 73/431, 118.1

[56] References Cited

U.S. PATENT DOCUMENTS

| | | | |
|---|---|---|---|
| 3,795,148 | 3/1974 | Luich . | |
| 3,809,830 | 5/1974 | Lockard et al. . | |
| 4,117,444 | 9/1978 | Hildreth et al. | 338/199 X |
| 4,626,823 | 12/1986 | Smith | 338/199 |

FOREIGN PATENT DOCUMENTS

| | | |
|---|---|---|
| 1107409 | 11/1956 | Fed. Rep. of Germany . |
| 812248 | 12/1961 | Fed. Rep. of Germany . |
| 7149350 | 3/1972 | Fed. Rep. of Germany . |
| 2515830 | 11/1976 | Fed. Rep. of Germany . |
| 3442349 | 7/1985 | Fed. Rep. of Germany . |
| 3447896 | 8/1985 | Fed. Rep. of Germany . |
| 3618927 | 11/1986 | Fed. Rep. of Germany . |

*Primary Examiner*—Jerry W. Myracle

*Attorney, Agent, or Firm*—Dennison, Meserole, Pollack & Scheiner

[57] ABSTRACT

In a throttle valve opening sensor including a substrate provided with a throttle valve opening detecting portion, a rotor adapted to be rotated in association with rotation of a throttle valve, a housing for rotatably supporting the rotor and incorporating the substrate, a packing mounted in the housing for sealing the substrate, and a contact mounted on the rotor and adapted to slide on the opening detecting portion; the improvement comprises a substrate pressing portion formed at the packing for inwardly pressing the substrate, an O-ring projecting portion formed at the packing on the outer peripheral side of the substrate pressing portion and tightly contacting with the housing, and a cover provided outside the packing for inwardly pressing the substrate pressing portion and the projecting portion of the packing.

2 Claims, 3 Drawing Figures

THROTTLE VALVE OPENING SENSOR

BACKGROUND OF THE INVENTION

The present invention relates to a throttle valve opening sensor for use with an internal combustion engine.

A conventional throttle valve opening sensor includes a substrate provided with a throttle valve opening detecting portion, a rotor adapted to be rotated in association with rotation of a throttle valve, a housing for rotatably supporting the rotor and incorporating the substrate, a packing mounted in the housing for sealing the substrate, and a contact mounted on the rotor and adapted to slide on the opening detecting portion. Air tightness of a substrate sealing part of the sensor is obtainable by using a resin filler or applying an adhesive material to the substrate fixed to the housing with a rubber packing or the like.

However, in the conventional throttle valve opening sensor, the air tightness of the substrate sealing part is deteriorated by temperature change and vibration as time is elapsed. Furthermore, workability is reduced, thereby increasing the manufacturing steps and costs.

SUMMARY OF THE INVENTION

It is a primary object of the present invention to provide a throttle valve opening sensor which may reliably maintain the air tightness of the substrate sealing part for a long time against temperature change and vibration.

It is another object of the present invention to provide a throttle valve opening sensor which may improve workability and reduce costs.

According to the present invention, in a throttle valve opening sensor including a substrate provided with a throttle valve opening detecting portion, a rotor adapted to be rotated in association with rotation of a throttle valve, a housing for rotatably supporting the rotor and incorporating the substrate, a packing mounted in the housing for sealing the substrate, and a contact mounted on the rotor and adapted to slide on the opening detecting portion; the improvement comprises a substrate pressing portion formed at the packing for inwardly pressing the substrate, an O-ring projecting portion formed at the packing on the outer peripheral side of the substrate pressing portion and tightly contacting with the housing, and a cover provided outside the packing for inwardly pressing the substrate pressing portion and the projecting portion of the packing.

With this arrangement, the packing is inwardly pressed by the cover, and accordingly, the O-ring projecting portion of the packing is pressed against the housing to thereby secure the air tightness. Furthermore, an inner part of the packing is pressed by the cover against the substrate to thereby secure a pressing effect of the packing against the substrate.

The invention will be more fully understood from the following detailed description and appended claims when taken with the drawings.

DETAILED DESCRIPTION OF THE PREFERRED EMBODIMENT

Figure 1:
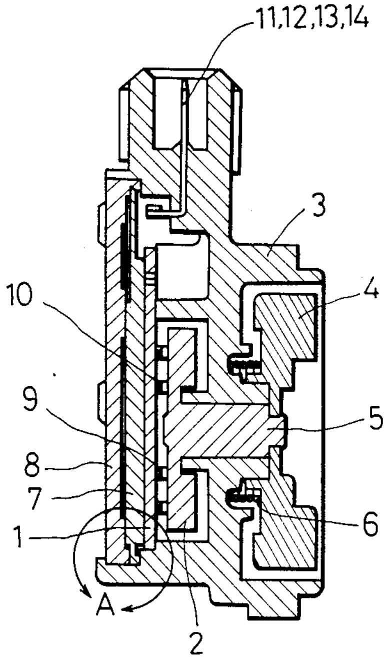
FIG. 1 is a vertical sectional view of a preferred embodiment according to the present invention.
Figure 2:
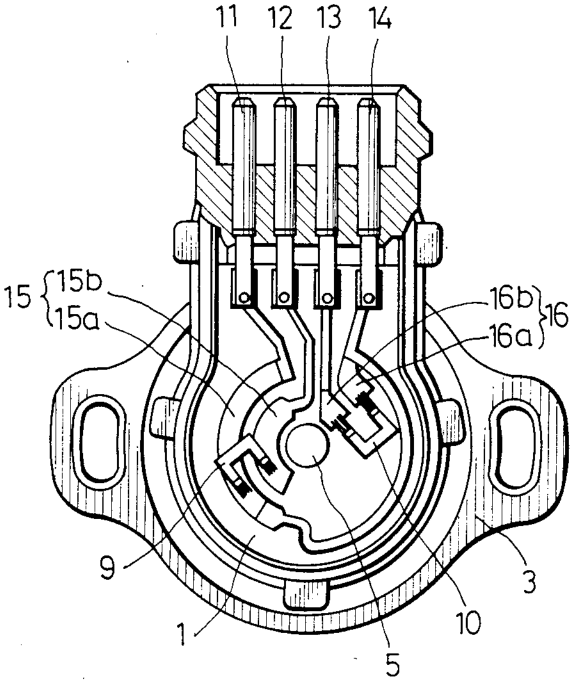
FIG. 2 is a plan view in partly section of a part in FIG. 1.
Figure 3:
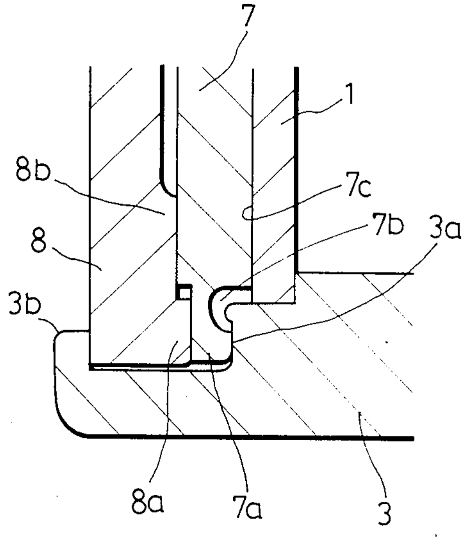
FIG. 3 is an enlarged view of a part A shown in FIG. 1.

Referring to FIGS. 1 to 3, reference numeral 3 designates a housing for incorporating a substrate 1, a rotor 2 and an external connecting lever 4. The housing 3 is formed with a bearing portion for rotatably supporting a shaft 5 of the rotor 2. The rotor 2 is provided with first and second contacts 9 and 10 each having a pair of contact portions. The substrate 1 is positioned in the housing 3 so that the contacts 9 and 10 may come into contact therewith.

Terminals 11 and 14 connected with power supply lead wires are connected to the substrate 1. Similarly, terminals 12 and 13 connected with signal output lead wires are connected to the substrate 1.

The shaft 5 of the rotor 2 is mounted on the bearing portion of the housing 3. a return spring (torsion spring) 6 is provided between the housing 3 and the external connecting lever 4 in such a manner that one end of the spring 6 is fixed to the lever 4, and the other end is fixed to the housing 3, thereby resiliently restricting the rotation of the lever 4. The external connecting lever 4 is connected to the shaft 5 of the rotor 2.

The rotor 2 is rotated in association with rotation of a throttle valve (not shown), and as a result, the first and second contacts 9 and 10 fixed to the rotor 2 are slid on the upper surfaces of a throttle valve opening detecting portion 15 and an idling position detecting portion 16 both printed on the substrate 1.

As shown in FIG. 2, the throttle valve opening detecting portion 15 printed on the substrate 1 has a form of partial sector about the center of the shaft 5 of the rotor 2. The idling position detecting portion 16 printed on the substrate 1 is opposed to the opening detecting portion 15, and has a form of partial sector about the center of the shaft 5. The opening detecting portion 15 consists of a resistor **15*a* and a collector 15*b*, while the idling position detecting portion 16 consists of a conductor 16*a* and a collector 16*b***.

As shown in FIG. 3, a rubber packing 7 is provided outside the substrate 1. The rubber packing 7 is formed at its outer periphery with an O-ring projecting portion **7*a* for sealing a seal portion 3*a* of the housing 3, and is further formed with a substrate pressing portion 7*c* for inwardly pressing the substrate 1 with a groove 7*b* defined therebetween. A cover 8 is provided outside the rubber packing 7, and is fixed by a caulking portion 3*b* of the housing 3. The cover 8 is formed with an outer pressing portion 8*a* for inwardly pressing the projecting portion 7*a* of the rubber packing 7, and with an inner pressing portion 8*b* for inwardly pressing the rubber packing 7**.

With this arrangement, the rubber packing 7 is inwardly pressed by the cover 8, and accordingly, the O-ring projecting portion **7*a* of the packing 7 is pressed by the outer pressing portion 8*a* of the cover 8, thus securing the air tightness between the projecting portion 7*a* of the rubber packing 7 and the seal portion 3*a* of the housing 3. Furthermore, as the packing 7 is pressed by the inner pressing portion 8*b* of the cover 8, the substrate 1 is pressed by the substrate pressing portion 7*c* of the packing 7, thus securing a pressing effect of the packing 7 against the substrate 1**.

Having thus described the preferred embodiment of the invention, it should be understood that numerous structural modifications and adaptations may be made without departing from the spirit of the invention.

What is claimed is:

1. In a throttle valve opening sensor including a substrate provided with a throttle valve opening detecting portion, a rotor adapted to be rotated in association with rotation of a throttle valve, a housing for rotatably supporting said rotor and incorporating said substrate, a packing mounted in said housing for sealing said substrate, and a contact mounted on said rotor and adapted to slide on said opening detecting portion; the improvement comprising a substrate pressing portion formed at said packing for inwardly pressing said substrate, an O-ring projecting portion formed at said packing on the outer peripheral side of said substrate pressing portion and tightly contacting with said housing, and a cover provided outside said packing for inwardly pressing said substrate pressing portion and said projecting portion of said packing.

2. The throttle valve opening sensor as defined in claim 1, wherein said cover comprises an inner pressing portion for inwardly pressing said substrate pressing portion of said packing and an outer pressing portion for inwardly pressing said projecting portion of said packing.

* * * * *